Figure 1:
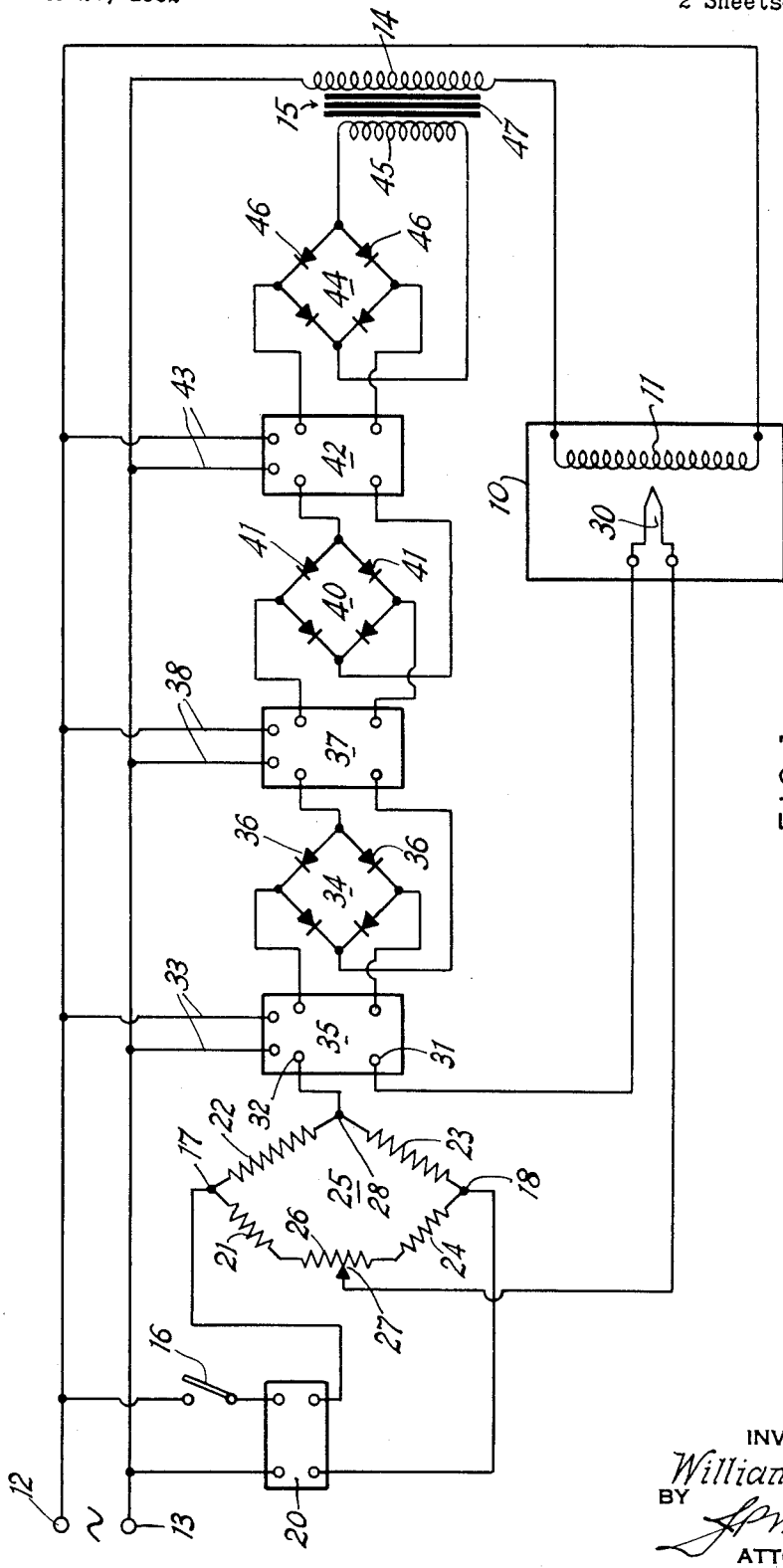

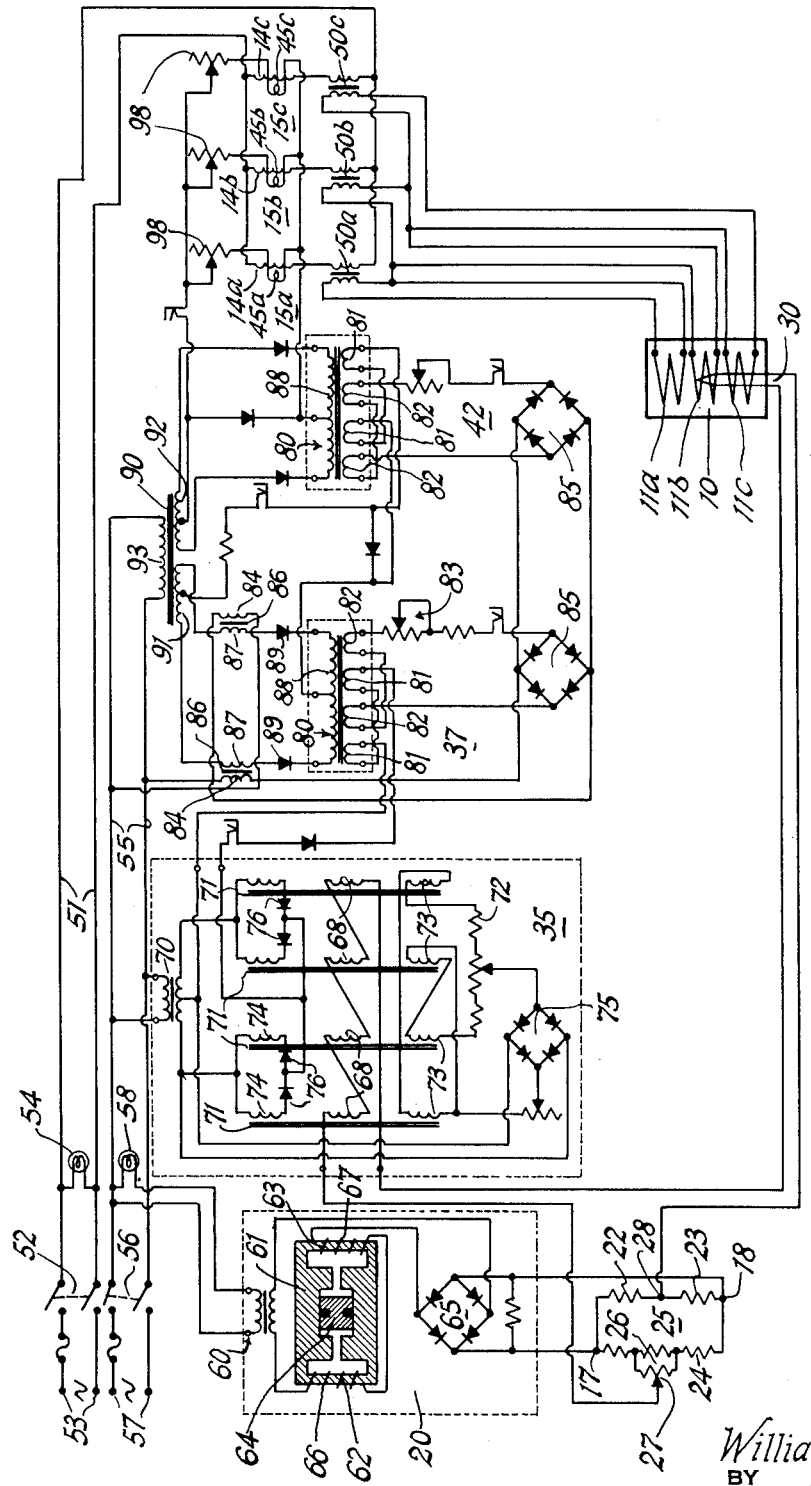

United States Patent Office 2,752,473
Patented June 26, 1956

2,752,473

MAGNETIC TYPE TEMPERATURE CONTROLLER

William T. Hage, Alliance, Ohio, assignor to The Babcock & Wilcox Company, New York, N. Y., a corporation of New Jersey Application June 26, 1952, Serial No. 295,763

3 Claims. (Cl. 219—20)

This invention relates to automatic temperature controllers and, more particularly, to a novel automatic temperature controller characterized by the absence of moving parts, contacts, electronic valves, standard cells, and the like.

Automatic temperature controllers are frequently used to maintain the temperature conditions of a controlled device at a predetermined value or within predetermined limits. Generally speaking, such controllers involve a temperature sensing element which is arranged to provide a control signal proportional to existing temperature conditions. This control signal is compared with a reference (obtaining its voltage from a battery) pre-set in accordance with desired temperature conditions, and frequently this reference is compared to the voltage from a "standard" cell. The resultant output signal produced when the controlled temperature deviates from the pre-set value is amplified and utilized to vary the heat input to the controlled device in a direction to restore the temperature to the desired value.

Controllers of this type usually use electronic valves for amplification of the output signal, the output of the electronic valves being used to operate relays which, in turn, control mechanism, generally including motors and contactors, for adjusting the heat input to the control device. While such controllers have been found to be satisfactory from the sensitivity standpoint and for a number of applications, their value is limited by the fact that the movable elements of the controller contacts, batteries, standard cells, etc., have a limited life. Furthermore, the electronic valves have an indeterminate or indefinite life.

In certain testing applications, as, for example, long period creep tests under controlled temperature conditions, it is imperative that the temperature be maintained absolutely constant at all times over a long period, such as 10,000 hours or more. Known temperature controllers are not adapted to this type of service as the predictable life of their components is of a substantially lesser order of magnitude than the order of magnitude of the test time. Consequently, the controllers are periodically out of service for replacement or re-adjustment of their components. During the time the temperature controller is out of service, the temperature of the control device may vary to such an extent that the test must be interupted and re-started. Naturally, interruption of these long period tests of materials under controlled temperature conditions is both costly and time-consuming, as it represents a waste of labor, power, and time.

In accordance with the present invention, the foregoing defects of known temperature controllers are overcome by providing a stepless or continuously variable automatic temperature controller characterized by the absence of moving parts and movable contacts, as well as by the absence of electronic valves, standard cells, batteries, and similar elements. More specifically, the output signal from a temperature sensitive element disposed in controlled furnace or the like is applied to a bridge to which is also applied a reference voltage derived from a magnetic current reference. The latter has no moving parts and is wholly magnetic in its action, requiring no electronic tubes or valves. Consequently, its life is many times that of the expected duration of any long period controlled temperature tests.

The bridge output voltage, which is the resultant of the reference voltage and the signal voltage, is amplified successive stages by means of magnetic amplifiers having dry-type rectifiers associated therewith. These amplifiers, being likewise solely of magnetic material, have no moving parts and do not include electronic valves, and consequently have a trouble-free life substantially equal to that of the magnetic current reference. The dry-type rectifiers have a useful, trouble-free life of at least 20,000 hours at full load, whereby their continuous performance is assured for controlled temperature tests of the order of 10,000 hours.

The rectified output from the last amplifier stage is applied to the control or D. C. winding of one or more saturable reactors in circuit with the electric power supply to the furnace heating elements. Such a reactor, which has no moving parts, varies the flow of current through its power or A. C. winding in inverse proportion to the D. C. current applied to its control winding. Thus, detection of temperature variations, amplification of the resultant control and signal, and utilization of the amplified signal to control the power for heating are all effected without the use of moving parts, contactors, or electronic valves.

For an understanding of the invention principles, reference is made to the following description of a typical embodiment thereof as illustrated in the accompanying drawings. In the drawings:

Fig. 1 is a schematic wiring diagram, partly in block form, illustrating the invention automatic temperature controller; and Fig. 2 is a schematic wiring diagram of a practical embodiment of the temperature controller.

Referring to Fig. 1 of the drawing, the invention temperature control system is illustrated as applied to control temperature conditions within an electric furnace schematically indicated at 10. Furnace 10 is shown as having a heating means or element, indicated at 11, supplied with power from an A. C. source connected to terminals 12 and 13. For a purpose to be described hereinafter, the A. C. or power winding 14 of a saturable reactor 15 is connected in series with heating element 11.

Power from the A. C. source is applied, through a control switch 16, to the input side of a magnetic current reference 20 which may be, by way of example, of the type shown and described in "General Electric Review" for October, 1950, page 44, Fig. 27. The constant current from reference 20 is supplied to junction points 17 and 18 of a bridge 25 comprising fixed impedances 21, 22, 23 and 24 and a variable impedance or potentiometer 26 having movable contact 27 associated therewith, thus providing a constant potential drop between points 17 and 18.

Contact 27 is connected to one terminal of a temperature sensitive element, such as a thermocouple 30, disposed in temperature sensing relation with furnace 10. The other terminal of thermocouple 30 is connected to one input terminal 31 of a magnetic amplifier 35. The other control input terminal 32 of amplifier 35 is connected to junction point 28 of bridge 25. Amplifier 35, which has an A. C. potential supplied thereto over conductors 33, may be of any suitable type, such as the "amplistat" illustrated and described on pages 41–46 in the aforementioned issue of "General Electric Review."

The output of amplifier 35 is applied, through a full wave rectifier 34 comprising bridge connected dry type rectifiers 36, to the input of a second similar magnetic amplifier 37, energized with an A. C. potential over conductors 38. The further amplified output of second stage amplifier 37 is applied through a full wave rectifier 40, comprising dry type rectifiers 41, to the input of a third similar magnetic amplifier 42 energized with A. C. over conductors 43. The output of amplifier 42 is rectified in a full wave rectifier 44, comprising dry type rectifiers 46, and the resultant rectified and amplified output is applied to the D. C. or control winding 45 of saturable reactor 15.

Reactor 15 operates in the usual manner. When full current is applied to its control winding 45, core 47 is substantially fully saturated and the impedance of power coil 14 is reduced to a value permitting substantially uninterrupted flow of current to heating element 11. As the control current to winding 45 is reduced, the saturation of core 47 is reduced and the impedance of coil 14 is correspondingly increased.

The described system operates in the following manner. Contact 27 of potentiometer 26 is so adjusted that the amplified and rectified resultant of the thermocouple voltage and the reference voltage is at a value such that the flow of current through heating element 11, controlled by the impedance of saturable reactor power coil 14, will maintain a pre-set temperature value in the furnace. To understand the operation of the system, it will be assumed that the temperature of furnace 30 drops below the pre-set value. Under such conditions, the output voltage of thermocouple 30 decreases. The relative values of the thermocouple and reference voltages, as applied to bridge 25, are so set that this condition will cause an increase in the input voltage to magnetic amplifier 35. This increased input or signal voltage is amplified by the successive magnetic amplifier stages, with the amplifier outputs being rectified by rectifiers 34, 40 and 44. The thus increased potential applied to control coil 45 of reactor 15 increases the saturation of reactor core 47. This, in turn, decreases the effective impedance of reactor power coil 14, and the resultant increased potential applied to heating element 11 raises the temperature of furnace 10 to restore the pre-set temperature value. When the temperature of furnace 10 is restored to its pre-set value, the current flow through coil 11 is maintained at a value sufficient to maintain the furnace temperature at the pre-set value. The control is a modulating one, in that the correction of temperature deviations is continuous.

Fig. 2 schematically illustrates a practical embodiment of the invention as applied to maintain a constant furnace temperature for a creep testing installation wherein specimens are held under predetermined stresses at a constant temperature for 10,000 hours or more. In Fig. 2, components identical with, or corresponding substantially to, components of Fig. 1 have been given the same reference characters.

Referring to Fig. 2, power for furnace 10 is supplied from an A. C. source through conductors 51, and "on-off" switch 52 being provided to connect conductors 51 to input terminals 53. A pilot lamp 54 is lit whenever switch 52 is closed. The furnace is heated by three elements 11a, 11b, and 11c, connected, respectively, to the secondary windings of transformer 50a, 50b and 50c. The transformer primaries are connected, in parallel with each other, across conductors 51 each primary winding being in series with a power coil of a saturable reactor 15a, 15b and 15c. The control coils of the saturable reactors have applied thereto the amplified and rectified signal potential which is the resultant of the voltages applied to bridge 25 from magnetic current reference 20 and thermocouple 30, the latter being disposed in temperature sensing relation with furnace 10.

The control circuit comprises a pair of conductors 55, 55 connectible by a switch 56 to terminals 57 having an A. C. potential applied thereto. A pilot lamp 58, connected across conductors 55, is lit whenever switch 56 is closed.

The control potential is applied to the primary winding of a transformer 60 forming a part of the magnetic current reference 20. This magnetic current reference is essentially a series reactor, and involves a magnetic structure 61 having spaced legs 62, 63 and embracing a permanent magnet 64. One end of the secondary winding of transformer 60 is connected to a coil 66 on leg 62 and this coil is connected in series with a second coil 67 on leg 63. The other end of the secondary winding of transformer 60 is connected to one junction point of a full wave dry-type rectifier 65. The opposite junction point of rectifier 65 is connected to the other end of coil 67. The other pair of junction points of rectifier 65 are connected to junction points 17 and 18 of bridge 25.

The magnetic current reference, which may be, for example of the type manufactured by General Electric Company, operates as follows. The portion of the magnetic circuit surrounded by the coils 66, 67 is caused to operate near saturation by means of permanent magnet 64. When current is drawn through the coils, it tends to neutralize some of the magnetizing effect of the permanent magnet. This causes the magnetic legs 62, 63 to operate below saturation, thus providing a higher inductive impedance for the coils to correspondingly limit the flow of current therethrough. The material composing the magnetic circuit, particularly inside coils 66, 67, is so selected as to have a nearly vertical magnetization characteristic, thus affording very close current control.

Adjustable contact 27 of bridge 25 is connected to one input terminal of amplifier 35, the other input terminal being connected to thermocouple 30 which is, in turn, connected to junction point 28 of bridge 25. The input terminals of rectifier 35 have connected thereacross a plurality of series-connected coils 68, each associated with a magnetic core 71. Potential is supplied to amplifier 35 through a transformer 70 connected between conductors 55 and a full wave dry-type rectifier 75. A pair of junction points of rectifiers 75 are connected to a bridge circuit involving a potentiometer 72 and four coils 73 each associated with one of the magnetic cores 71.

The opposite terminals of the secondary winding of transformer 70 are each connected to a pair of parallel connected coils 74 each associated with a magnetic core 71. The output of amplifier 35 is derived from the middle point of the secondary winding of transformer 70 and the common junction of coils 74 with which are associated dry-type rectifiers 76. The input signal applied through coils 68 is amplified, and the amplified output derived from coils 74.

The second and third stage amplifiers 37 and 42 each include a transformer 80 and a dry-type full wave rectifier 85. Each transformer has four primary windings, including two windings 81 connected in series across the output of the preceding amplifier stage, and two windings 82 connected in series through a potentiometer 83 across rectifier 85.

Alternating current potential is applied to rectifier 85 from conductors 55 to a circuit including control coils 84 of reactors 86, the control coils being connected in series. The power coils 87 of the reactor are each connected between one terminal of the primary winding 88 of transformer 80 and one terminal of a secondary winding 91 of a transformer 90 having a second secondary winding 92 and a primary winding 93 connected across conductors 55. Rectifiers 89 are connected in series with each power coil. The output potential of amplifier 37 is taken from the middle point of secondary winding 91 and the middle point of the primary winding 88 of the associated transformer.

This output is applied to the series-connected secondary winding 81 of the transformer 80 associated with the amplifier 42, the other secondary windings 82 being connected in series across the associated rectifier 85. The amplifier output from amplifier 42 is taken from the middle point of transformer secondary winding 92 and the middle point of transformer primary winding 88. This amplified output signal is applied, in parallel, to the control coils 45a, 45b, and 45c of the saturable reactors 14a, 14b and 14c. A potentiometer 98 is connected in series with each reactor control coil to provide adjustment of the threshold value of the reactors and thus of the current supplied to the heating elements of furnace 10.

The system of Fig. 2 operates in the same manner as does that of Fig. 1. The signal applied to the input of amplifier 35 is the resultant of the potential applied to bridge 25 from thermocouple 30 and magnetic current reference 20. If the temperature of furnace 10 increases, thus increasing the output potential of thermocouple 30, the resultant input signal to the three amplifier stages is reduced. This, in turn, reduces the D. C. potential applied to the reactor control coils, decreasing the saturation of the reactors. The decreased reactor saturation increases the impedance of the reactor power coils and thus reduces the potentials applied to the heating elements of furnace 10 to restore the temperature to the pre-set.

As will be clear from the foregoing, the invention temperature controller has no moving parts, no moving contactors, no motors, no electron tubes, no frictional bearing surfaces, and does not require a standard cell for reference purposes or a battery for the bridge power supply. Consequently, it is free of any components liable to become inoperative or maladjusted during prolonged operation. All of the components have a minimum, useful, trouble-free life, at full load which is a multiple of the time required for long period testing of materials at a controlled pre-set temperature. As one specific example, the shortest life components are the dry-type rectifiers, and even these have a minimum useful life, at full load, of 20,000 hours or more. This should be compared with the maximum duration of such long period tests, which is of the order of 10,000 hours. Also, in practical operation, the controller is seldom if ever operating at full load.

While a specific embodiment of the invention has been shown and described in detail to illustrate the application of the invention principles, it will be understood that the invention may be embodied otherwise without departing from such principles.

I claim:

1. An automatic temperature controller for maintaining a constant pre-set temperature of an electrically heated device comprising, in combination, a source of A. C. potential in circuit connection with the heating means of said device; a temperature sensing element operatively associated with said device and having an output electric potential substantially proportional to the temperature of said device; a magnetic current reference connected to said A. C. source and operable to provide a substantially constant A. C. reference current; reference potential means comprising a fixed impedance connected to the output of said magnetic means and thus having a substantially constant potential drop thereacross; comparator means having inputs in circuit connection with said sensing element and said magnetic current reference and constructed and arranged to provide an output signal potential having a sense and magnitude corresponding to the differential of the reference potential and the output potential of said element; magnetic amplifier means connected to the output of said comparator means to amplify the signal potential; inductive means interposed between said A. C. source and said heating means; and dry-type rectifier means connected to the output of said amplifier means and operatively associated with said inductive means to modulate the effective impedance of the latter in accordance with the amplified value of the signal potential.

2. An automatic temperature controller for maintaining a constant pre-set temperature of an electrically heated device comprising, in combination, a source of A. C. potential in circuit connection with the heating means of said device; a temperature sensing element operatively associated with said device and having an output electric potential substantially proportional to the temperature of said device; a magnetic current reference connected to said A. C. source and operable to provide a substantially constant A. C. reference current; reference potential means comprising a fixed impedance connected to the output of said magnetic means and thus having a substantially constant potential drop thereacross; comparator means having inputs in circuit connection with said sensing element and said magnetic current reference and constructed and arranged to provide an output signal potential having a sense and magnitude corresponding to the differential of the reference potential and the output potential of said element; magnetic amplifier means connected to the output of said comparator means to amplify the signal potential; a dry-type rectifier connected to the output of said amplifier means; and a saturable reactor having its control winding connected to said rectifier and its power winding connected between said A. C. source and said heating means to modulate the supply of current to said heating means in accordance with the amplified and rectified signal potential.

3. An automatic temperature controller for maintaining a constant pre-set temperature of an electrically heated device comprising, in combination, a source of A. C. potential in circuit connection with the heating means of said device; a temperature sensing element operatively associated with said device and having an output electric potential substantially proportional to the temperature of said device; a magnetic current reference connected to said A. C. source and operable to provide a substantially constant A. C. reference current; reference potential means comprising a fixed impedance connected to the output of said magnetic means and thus having a substantially constant potential drop thereacross; magnetic amplifier means; a bridge circuit interconecting said reference potential means, said temperature sensing element, and the input of said amplifier means and arranged to provide, at the input of said amplifier means, a signal potential having a sense and magnitude corresponding to the differential of the reference potential and the output potential of said sensing element; a dry-type rectifier connected to the output of said amplifier means; and a saturable reactor having its control winding connected to said rectifier and its power winding connected between said A. C. source and said heating means to modulate the supply of current to said heating means in accordance with the amplified and rectified signal potential.

References Cited in the file of this patent

UNITED STATES PATENTS

| | | |
|---|---|---|
| 1,730,254 | Thomas | Oct. 1, 1929 |
| 2,086,120 | Croden | July 6, 1937 |
| 2,376,488 | Jones | May 22, 1945 |
| 2,429,827 | Lamm | Oct. 28, 1947 |
| 2,496,860 | Davis | Feb. 7, 1950 |
| 2,556,065 | Callender | June 5, 1951 |
| 2,608,635 | Mershon | Aug. 26, 1952 |

OTHER REFERENCES

Wright: Journal of Scientific Instruments, vol. 24, No. 10, Oct. 1947, pp. 258, 259.

Ogle: General Electric Review, vol. 53, No. 2, Feb. 1950, pp. 32–35.

Ogle: General Electric Review, vol. 53, No. 8, Aug. 1950, pp. 41–44.

Ogle: General Electric Review, vol. 53, No. 10, Oct. 1950, pp. 41–46.